(12) United States Patent
Bauer

(10) Patent No.: US 10,335,709 B2
(45) Date of Patent: Jul. 2, 2019

(54) APPARATUS FOR DEWATERING FLUIDS

(71) Applicant: HYDAC FILTER SYSTEMS GMBH, Sulzbach/Saar (DE)

(72) Inventor: Martin Bauer, Lebach (DE)

(73) Assignee: HYDAC FILTER SYSTEMS GMBH, Sulzbach/Saar (DE)

( * ) Notice: Subject to any disclaimer, the term of this patent is extended or adjusted under 35 U.S.C. 154(b) by 477 days.

(21) Appl. No.: 14/778,399

(22) PCT Filed: Mar. 24, 2014

(86) PCT No.: PCT/EP2014/000789
§ 371 (c)(1),
(2) Date: Sep. 18, 2015

(87) PCT Pub. No.: WO2014/154346
PCT Pub. Date: Oct. 2, 2014

(65) Prior Publication Data
US 2016/0271512 A1    Sep. 22, 2016

(30) Foreign Application Priority Data

Mar. 23, 2013 (DE) .......... 10 2013 005 108

(51) Int. Cl.
*C10G 33/00* (2006.01)
*C10G 33/06* (2006.01)
(Continued)

(52) U.S. Cl.
CPC ......... *B01D 1/0064* (2013.01); *B01D 1/0082* (2013.01); *B01D 17/0205* (2013.01);
(Continued)

(58) Field of Classification Search
CPC ........ B01D 1/0064; B01D 1/007; B01D 1/14; B01D 3/16; B01D 3/26; B01D 3/38;
(Continued)

(56) References Cited

U.S. PATENT DOCUMENTS 4,681,660 A   7/1987 Budny
5,211,856 A   5/1993 Shen
(Continued)

FOREIGN PATENT DOCUMENTS

WO   2010/042663   4/2010

OTHER PUBLICATIONS

International Search Report (ISR) dated Jul. 18, 2014 in International (PCT) Application No. PCT/EP2014/000789.

*Primary Examiner* — Jonathan Miller
*Assistant Examiner* — Jonathan Luke Pilcher
(74) *Attorney, Agent, or Firm* — Wenderoth, Lind & Ponack, L.L.P.

(57) ABSTRACT

An apparatus (10) for dewatering fluids includes a dewatering chamber (12) through which the fluid for dewatering, especially by a gas that dries the fluid, can flow via an inlet (30) from a fluid reservoir (80) to a fluid input (16) of the dewatering chamber (12) and an outlet (32) from a fluid output (20) of the dewatering chamber (12) to the fluid reservoir (80). A common line (34) is assigned alternately to the inlet (30) and the outlet (32). A fluid pump (36) is disposed within the common line (34). A control valve (40) connects the common line (34) to the fluid reservoir (80) in a first position and to the fluid output (20) of the dewatering chamber (12) in a second position. A flow divider (82) disposed at the opposite end of the common line (34) from the control valve (40) divides the fluid stream coming from the fluid pump (36) into a first substream (t1) that leads to the fluid input (16) of the dewatering chamber (12) and a second substream (t2) that leads to the fluid reservoir (80).

11 Claims, 3 Drawing Sheets

(51) Int. Cl.
    *C10G 33/08*     (2006.01)
    *C10G 7/04*     (2006.01)
    *B01D 1/00*     (2006.01)
    *B01D 17/02*     (2006.01)
    *B01D 17/12*     (2006.01)

(52) U.S. Cl.
    CPC .............. *B01D 17/12* (2013.01); *B01D 1/007* (2013.01); *C10G 7/04* (2013.01); *C10G 33/00* (2013.01); *C10G 33/06* (2013.01); *C10G 33/08* (2013.01)

(58) Field of Classification Search
    CPC ........ B01D 3/4288; B01D 3/14; C10G 33/00; C10G 33/06; C10G 33/08; C10G 7/04
    See application file for complete search history.

(56) References Cited

U.S. PATENT DOCUMENTS

| | | | |
|---|---|---|---|
| 6,372,123 B1 * | 4/2002 | Kresnyak | C10O 33/00 208/187 |
| 8,491,785 B2 * | 7/2013 | Evanovich | B01D 1/14 210/151 |
| 9,782,693 B2 * | 10/2017 | Evanovich | B01D 17/0214 |
| 2012/0080363 A1 | 4/2012 | Evanovich et al. | |
| 2014/0158643 A1 | 6/2014 | Evanovich et al. | |
| 2016/0271512 A1 * | 9/2016 | Bauer | B01D 17/0205 |

\* cited by examiner

State of the Art

APPARATUS FOR DEWATERING FLUIDS

FIELD OF THE INVENTION

The invention relates to an apparatus for dewatering fluids, comprising a dewatering chamber through which a fluid can flow to be at least partially dewatered, in particular by a gas that dries the fluid. A supply line extends from a fluid reservoir to a fluid inlet of the dewatering chamber for fluid that is to be dewatered. A discharge line for at least partially dewatered fluid extends from a fluid outlet of the dewatering chamber to the fluid reservoir. A shared line, alternately assigned to the fluid inlet and the fluid outlet, has a fluid pump disposed in the shared line. A control valve connects the shared line with the fluid reservoir in a first setting and with the fluid outlet of the dewatering chamber in a second setting.

BACKGROUND OF THE INVENTION

An apparatus of this type, for dewatering fluids, is disclosed WO 2010/042663 A2. In this known apparatus, a further control valve is disposed at the end of the shared line opposite the control valve, which connects the shared line to the fluid inlet of the dewatering chamber when in a first setting and to the fluid reservoir when in a second setting. A supply line is formed for fluid that is to be dewatered when the two control valves are in the respective first setting, which fluid can flow from the fluid reservoir via the shared line to the fluid inlet of the dewatering chamber. By switching the two control valves to the respective second settings, a discharge for at least partially dewatered fluid is formed, which discharge can flow from the fluid outlet of the dewatering chamber via the shared line to the fluid reservoir. The alternating assignment of the shared line to the supply and to the discharge enables a construction and an operation of the apparatus with a single fluid pump disposed in the shared line. Further fluid pumps are unnecessary, such that, on the whole, a simpler structure of the apparatus is ensured, having a reduced weight and structural size.

SUMMARY OF THE INVENTION

The invention addresses the object of further simplifying the construction of the apparatus for dewatering fluids, and to implement an operation of the apparatus that is less prone to malfunctioning and that loads the individual components to a lesser extent.

This object is basically achieved by an apparatus according to the invention for dewatering fluids having a flow divider disposed on the end of the shared line opposite the control valve. The flow divider divides the fluid flow coming from the fluid pump into a first substream leading to the fluid inlet of the dewatering chamber, and into a second substream leading to the fluid reservoir.

The further control valve on the end of the shared line opposite the control valve is eliminated and replaced by a flow divider in the design of the apparatus for dewatering fluids according to the invention. At this end, the shared line is connected to both the fluid inlet of the dewatering chamber as well as to the fluid reservoir, and guides respective substreams thereto accordingly. When the control valve is in the first setting, fluid that is to be dewatered is removed from the fluid reservoir and conveyed to the dewatering chamber; and at the same time, a portion of the fluid passes by the dewatering chamber, thus untreated, and is conducted, as a second substream, back to the fluid reservoir. When the control valve is in the second setting, at least partially dewatered fluid is conducted, as a second substream, back to the fluid reservoir; and at the same time, a portion of the fluid is again conducted as a first substream to the dewatering chamber. In this manner, the dewatering performance of the apparatus according to the invention for dewatering fluids is increased. As a result of the design according to the invention, for the apparatus for dewatering fluids, there is, in particular, the advantage that the fluid pump can be operated constantly, and as a result, is subjected to a lower load during operation of the apparatus.

Preferably, independently of the extent of contamination of the fluid flow, and in each operating state of the apparatus, the flow divider divides the fluid flow arriving from the fluid pump into the first and second substreams at a fixed, definable ratio.

The flow divider preferably divides the fluid flow arriving from the fluid pump into the first and second substreams at a fixed ratio of 50:50, such that the two substreams are nearly equal in terms of volume. As a result, there is the advantage that the same quantity of fluid is supplied to the dewatering chamber and returned to the fluid reservoir, respectively.

A particularly quick filling of the dewatering chamber is obtained in that the flow divider divides the fluid flow arriving from the fluid pump into the first and second substreams at a ratio of 70:30. In the first setting, also referred to as the supply setting, the control valve conducts only a portion, comprising 30% by volume, of the fluid removed from the fluid reservoir back to the fluid reservoir. In the second setting of the control valve, also referred to as the discharge setting, 70% by volume of the fluid is again conducted to the dewatering chamber for further dewatering, and only 30% by volume of the fluid is returned to the fluid reservoir, as at least partially dewatered fluid. These advantages can be obtained with any fixed proportional ratio between the two substreams, selected such that the first substream is greater than the second sub stream.

Furthermore, a fixed, predefined ratio between the two substreams at the flow divider can be selected, according to which the second substream is greater than the first substream. The quantity divider or flow divider enables, in any case, a consistent division of the fluid quantities, independently of the existing fluid pressure at the inlet side.

In a preferred embodiment of the apparatus according to the invention, at least one sensor is provided. The control valve connects the shared line, having the fluid pump disposed therein, to the fluid reservoir, or to the fluid outlet of the dewatering chamber, depending on the value registered at the respective sensor. When the apparatus according to the invention is in operation, the control valve typically first assumes its first setting, assigned to the supply line, such that the dewatering chamber is filled with fluid that is to be dewatered from the fluid reservoir. After the dewatering chamber is filled, the control valve switches over to its second setting, allocated to the discharge line, such that at least partially dewatered fluid is returned from the dewatering chamber to the fluid reservoir.

A sensor that can register the contamination and/or the water content of the fluid is preferably provided, which is preferably incorporated in the shared line. A sensor of this type enables the determination of the water content in the fluid supplied from the fluid reservoir, which is to be dewatered, and the at least partially dewatered fluid arriving from the dewatering chamber. The switching of the apparatus according to the invention can be selected such that the control valve switches from the second setting, or the discharge line setting, respectively, back to the first setting, or to the supply line setting, respectively, when a lower threshold value for the water content has been reached.

Particularly preferably, at least one, preferably two filling level sensors are provided, for registering the fluid presently in the dewatering chamber. In this manner, the filling level of the dewatering chamber can be monitored, and the dewatering chamber can be filled to a maximum filling level when the control valve is in the first setting or supply line setting. When the control valve is in the second setting or discharge line setting, the dewatering chamber can be emptied to a minimal filling level.

The dewatering of the fluid in the dewatering chamber occurs, for practical purposes, by a gas that dries the fluid, flowing through the dewatering chamber in the opposite direction of the fluid. Advantageously, a gas supply for supplying dry gas to the dewatering chamber, and a gas discharge for removing wet gas from the dewatering chamber are provided.

Advantageously, a vacuum pump is disposed in the gas supply and/or in the gas discharge. The dewatering chamber is designed as a vacuum tower. A particularly effective dewatering of the fluid during the flow through the dewatering chamber is obtained in this preferred embodiment of the invention.

According to the invention, the features specified above and described below can be implemented, in each case, in any combination thereof.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure that are schematic and not to scale.

DETAILED DESCRIPTION OF THE INVENTION

Figure 1:
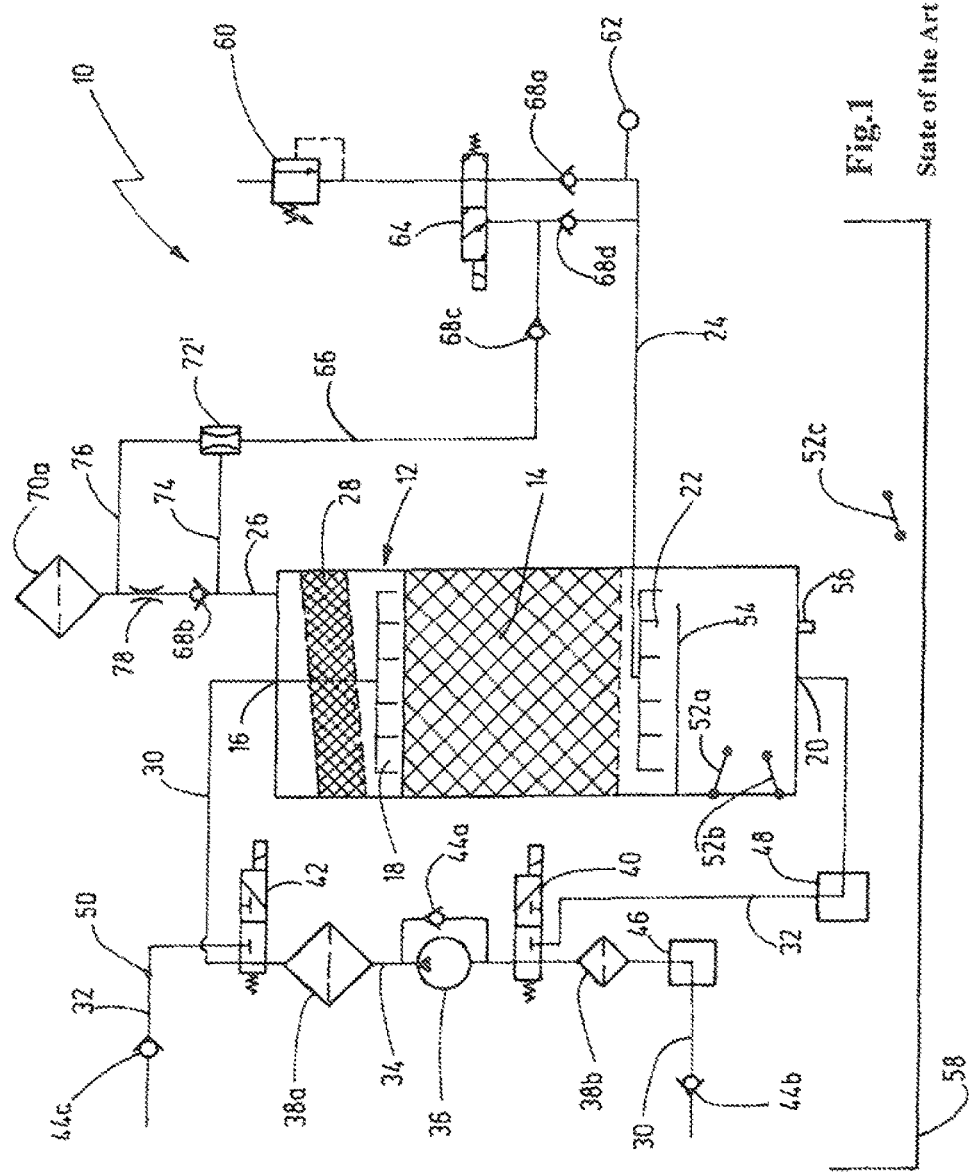
FIG. 1 is a circuit diagram of an apparatus known from the prior art for dewatering fluids.

FIG. 1 shows the circuit diagram for an apparatus 10 for dewatering fluids disclosed in WO 2010/042663 A2. Both fluid to be dewatered as well as fluid drying gas flow through a dewatering chamber 12 of the apparatus 10. The fluid to be dewatered is supplied to the dewatering chamber 12 above a filler material 14, and dry gas is supplied beneath the filler material 14. The filler material 14 nearly entirely fills the main part of the dewatering chamber 12 between a fluid distributor 18 for the fluid that is to be dewatered and supplied to dewatering chamber 12, and a gas distributor 22 for the dry gas supplied to dewatering chamber 12. Filler material 14 is selected to promote the exchange of water between the fluid that contains water and the dry gas. The fluid supplied to the fluid distributor 18 flows through the dewatering chamber 12 and through the filler material 14, accordingly, from top to bottom, due to gravity. The gas supplied at the gas distributor 22 flows through the dewatering chamber 12 and through the filler material 14, accordingly, from bottom to top, due to specific gravity, thus in the opposite direction of the fluid.

Fluid to be dewatered is conducted from a fluid reservoir, not shown in FIG. 1, via a supply line 30, to a fluid inlet 16 of the dewatering chamber 12, and from there to a fluid distributor 18. The fluid distributor 18 is designed in the manner of a shower head, such that the fluid to be dewatered is supplied evenly distributed over the cross-sectional surface area of the dewatering chamber 12. In a corresponding manner, the gas distributor 22 is designed in the manner of a shower head, such that dry gas, also referred to as drying gas, is likewise supplied evenly distributed over the cross-sectional surface area of the dewatering chamber 12. A fluid outlet 20 is disposed on the lower end of the dewatering chamber 12, opposite the fluid inlet 16 disposed on the upper end of the dewatering chamber 12. At least partially dewatered fluid is conducted out of the dewatering chamber 12 via the fluid outlet 20, and returned to the fluid reservoir via a discharge line 32 connected to the fluid outlet 20. As a matter of course, the at least partially dewatered fluid can be conducted to another fluid reservoir. A gas supply line 24 for the dry gas runs along the side of the dewatering chamber 12 and further to the gas distributor 22. A gas discharge 26 for wet gas is disposed on the upper end of the dewatering chamber 12. The wet gas, on the way from the filler material 14 to the gas discharge 26, passes through a foam component 28, disposed in the upper part of the dewatering chamber 12 above the fluid distributor 18, which foam component serves to remove moisture.

A shared line 34, in which a fluid pump 36 and a fluid filter 38a are disposed, is assigned, in an alternating manner, to the supply line 30 for fluid that is to be dewatered, and to the discharge line 32 for at least partially dewatered fluid. A check valve 44a is connected in parallel to the fluid pump 36. The shared line 34 is connected, in an alternating manner, into the supply line 30 or the discharge line 32 via a first control valve 40 disposed upstream of the fluid pump 36, i.e. in front thereof with respect to the direction in which the fluid flows, and into a second control valve 42 disposed downstream of the fluid pump 36, i.e. after the fluid pump with respect to the direction in which the fluid flows. In the shown, respective first setting, the first control valve 40 connects the fluid reservoir with the shared line 34 and the second control valve 42 connects the shared line 34 with the fluid inlet 16 of the dewatering chamber 12. Thus, the shared line 34 is part of the supply line 30 when the control valves 40, 42 are in the respective first setting, also referred to as the supply setting. When in the respective second settings, not shown, the first control valve 40 connects the fluid outlet 20 of the dewatering chamber 12 to the shared line 34, and the second control valve 42 connects the shared line 34 to the fluid reservoir. Thus, the shared line 34 is a part of the discharge line 32 when the control valves 40, 42 are in the respective second setting, also referred to as the discharge setting. The fluid pump 36 serves both to convey fluid that is to be dewatered into the supply line 30 as well as to convey at least partially dewatered fluid into the discharge line 32. The control valves 40, 42 are both designed as 3/2-way control valves that can be actuated electrically.

A check valve 44b is disposed at the end of the supply line 30 assigned to the fluid reservoir. A sensor 46, for determining the contamination and/or water content of the fluid supplied thereto that is to be dewatered, and a fluid filter 38b are disposed downstream of the check valve 44b. A display 48 for visual control of the at least partially dewatered fluid and/or for monitoring the functioning of the apparatus 10 can be disposed in the discharge line 32 between the dewatering chamber 12 and the shared line 34. The water content of the at least partially dewatered fluid can be registered at a test point 50 for testing purposes, for example, by a sensor (not shown) disposed between the shared line 34 and the fluid reservoir in the discharge line 32. A check valve 44c is disposed at the end of the discharge line 32 assigned to the fluid reservoir.

To monitor the filling and the emptying of the dewatering chamber 12, filling level sensors 52a, 52b are disposed in the lower part of the dewatering chamber 12, below the gas distributor 22. An upper filling level sensor 52a is allocated to a maximum filling level, and emits a signal indicating that the dewatering chamber 12 is not to be filled further and that the first control valve 40 is to be switched from the first setting or the supply setting to the second setting, or the discharge setting. As soon as the first control valve 40 is in the second setting, and the second control valve 42 is still in the first setting, the fluid can be conducted multiple times through the dewatering chamber 12 in a circulating manner, and dewatered therein. When the second control valve 42 is switched to the second setting, the discharge line 32 to the fluid reservoir is opened, and at least partially dewatered fluid is conducted out of the dewatering chamber 12. A lower filling level sensor 52b allocated to the minimum filling level emits a signal indicating that the no further fluid is to be removed from the dewatering chamber 12 and that at least the second control valve 42 is to be switched back to the first setting.

The fluid that is at least partially dewatered when flowing through the filler material 14 through contact with gas flowing in the opposite direction, exits the filler material 14 at the underside thereof, flows past the gas distributor 22, and arrives at a deflecting component 54 designed as a deflecting plate. From deflecting component 54, that fluid flow continues to flow into the lower part of the dewatering chamber 12. From there, it can be discharged via the fluid outlet 20 assigned to the discharge line 32. Alternatively, for maintenance purposes or during operational malfunctions for example, the fluid can exit via a fluid discharge 56. The fluid ends up, via the fluid discharge 56, in a collecting pan 58, in which a further filling level sensor 52c is disposed.

The gas serving as the drying medium is supplied to the gas supply 24 via a gas compressor 60, from the exterior, i.e. from the environment. The gas pressure of the supplied gas is monitored by a pressure gauge 62. Gas can be conducted to the gas supply 24 via a gas return 66 instead of the gas compressor 60 by a further control valve 64. A further check valve 68a, 68c, 68d is disposed, in each case, in the respective supply line to the gas supply 24 and in the gas return 66. A further check valve 68b and an aperture 78 are disposed in the gas discharge 26, to which a gas filter 70 is attached, by which wet gas can be discharged into the environment. A first line 74 and a second line 76 branch off from the gas discharge 26 to a vacuum unit 72', which is designed as a Venturi vacuum unit. The gas return 66 leads from the vacuum unit 72' to a further control valve 64, by which the gas return 66 is connected to the gas supply 24 when it is in its second setting. When the further control valve 64 is in this second setting, gas is conducted multiple times through the dewatering chamber 12 in a circulating manner.

Figure 2:
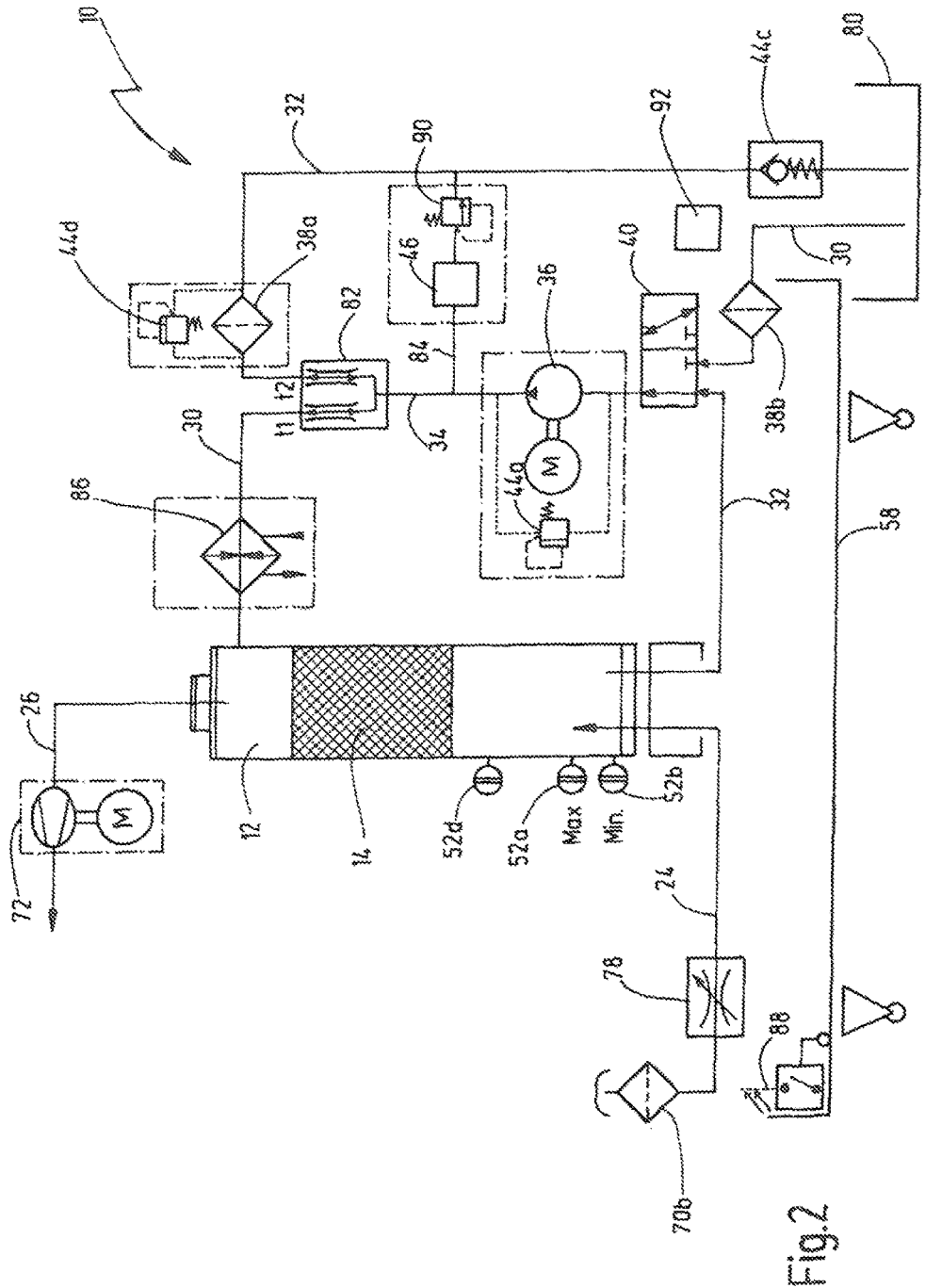
FIG. 2 is a circuit diagram of an apparatus for dewatering fluids according to an exemplary embodiment of the invention.

FIG. 2 shows a circuit diagram for an apparatus 10 for dewatering fluids according to the invention. The construction of the apparatus 10 corresponds for the most part to the apparatus 10 shown in FIG. 1, wherein substantial differences are depicted in FIG. 2 and described below. A substantial component of the apparatus 10 according to the invention is a flow divider 82 disposed at the end of the shared line 34 opposite the control valve 40. Flow divider 82 has first and second conduits that divide the fluid flow arriving from the fluid pump 34 into a first substream t1 leading to the dewatering chamber 12 and a second substream t2 leading to the fluid reservoir 80. The division ratio between the first substream t1 and the second substream t2 is a fixed value. The first substream t1 is preferably greater than the second substream t2 to ensure that the tower receives a steady loading, and to avoid the occurrence of any dead volume.

The dewatering chamber 12 has the filler material 14 disposed therein and is designed as a vacuum tower, with the gas supply 24 at the underside and with the gas discharge 26 at the upper surface. A vacuum pump 72 is disposed in the gas discharge 26. An adjustable aperture 78 is disposed in the gas supply 24 for adjusting the vacuum. Furthermore, a gas filter 70b, in particular an air filter, is disposed in the gas supply 24, for cleaning the gas supplied to the dewatering chamber 12.

The fluid pump 36 has the check valve 44a assigned and connected in parallel thereto and is disposed in the shared line 34. Shared line 34 is alternately connected to the supply line 30 from the fluid reservoir 80 to the dewatering chamber 12 for fluid that is to be dewatered, and to the discharge line 32 from the dewatering chamber 12 to the fluid reservoir 80 for at least partially dewatered fluid. The fluid filter 38a, disposed downstream of the fluid pump 36, is disposed in the part of the discharge line 32 leading from the shared line 34 to the fluid reservoir 80, and is additionally secured by a check valve 44d connected in parallel thereto. The sensor 46 for registering contamination and/or the water content of the fluid conducted in the shared line 34 is disposed in a part of a third line 84 leading to the discharge line 32, leading from the shared line 34 to the fluid reservoir 80 and connected in series with a pressure relief valve 90.

A temperature control unit 86, in particular a heating element, can be disposed in the part of the supply line 30 leading from the shared line 34 to the dewatering chamber 12, to bring the fluid supplied to the dewatering chamber 12 to an appropriate temperature, in particular to heat said fluid. For this, the values recorded by a further sensor 92 of the ambient temperature may be taken into account. Furthermore, a floating switch 88 assigned to the collecting pan 58, as well as a third filling level sensor 52d assigned to an overflow in the dewatering chamber 12, or vacuum tower, respectively, are shown in FIG. 2. The filling level sensors 52a, 52b, 52d assigned to the dewatering chamber 12 are part of a further floating switch, which actuate the hydraulic pump 36 as well as the valve 40, depending on the filling level in the tower, to ensure the fluid supply from the tank 80.

Figure 4:
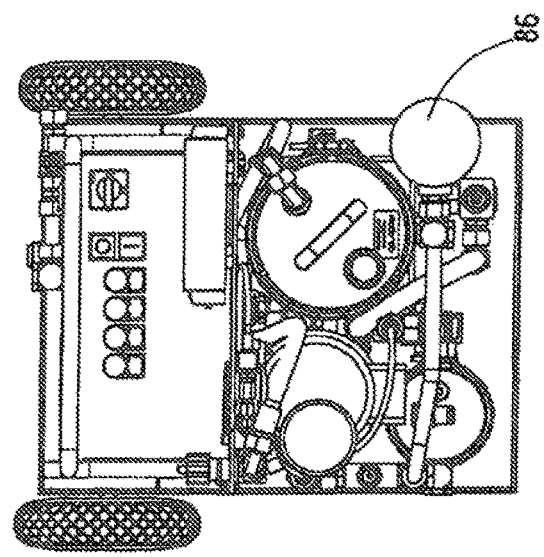
FIG. 4 is a top view of the exemplary apparatus of FIG. 3.
Figure 3:
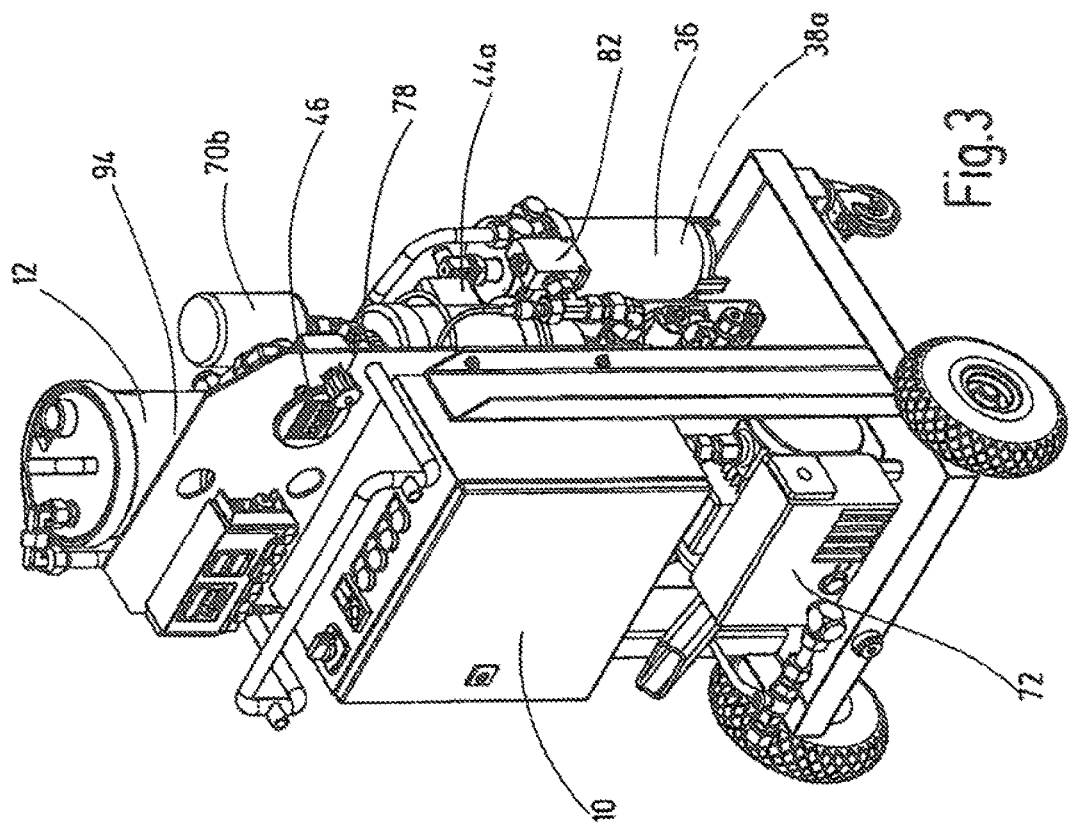
FIG. 3 is a perspective view of the exemplary embodiment of the apparatus according to the invention, for dewatering fluids.

FIG. 3 shows a side perspective view, and FIG. 4, shows a top view of an exemplary structural assembly of the apparatus 10, having a cylindrical housing 94 defining the dewatering chamber 12. The fluid pump 36, the gas compressor 60 and the vacuum pump 72 are disposed outside the outer sheath of the housing 94, and at a spacing thereto. Apart from this description, the reference symbols in FIGS. 3 and 4 refer to the explanations above. The apparatus 10 is designed on the whole as a marketable unit, and designed in accordance with the respective requirements. The apparatus can be stationary, but preferably is designed such that it can be transported by a dolly, preferably by hand, such that it can be used at various locations without difficulty.

While one embodiment has been chosen to illustrate the invention, it will be understood by those skilled in the art that various changes and modifications can be made therein without departing from the scope of the invention as defined in the claims.

The invention claimed is:

1. An apparatus for dewatering fluids, comprising:
a dewatering chamber through which a fluid can flow for at least partial dewatering therein and having a fluid inlet and a fluid outlet;
a fluid reservoir;
a supply line connected in fluid communication with said fluid inlet of said dewatering chamber and said fluid reservoir to supply the fluid to be dewatered to said dewatering chamber, said supply line including a shared line;
a discharge line connected in fluid communication with said fluid outlet of said dewatering chamber and said fluid reservoir for at least partially dewatered fluid, said discharge line also including said shared line, said shared line being selectively connected in fluid communication to said supply line and said discharge line;
a fluid pump in said shared line;
a control valve selectively connecting said shared line to said fluid reservoir in a first setting thereof or to said dewatering chamber in a second setting thereof;
a flow divider at an end of said shared line opposite said control valve, said flow divider having constantly open first and second conduits dividing fluid flow from said fluid pump into a first substream conveyed to said fluid inlet and a second substream conveyed to said fluid reservoir, said flow divider dividing the fluid flow from said fluid pump into the first and second substreams at a fixed and defined ratio of substreams independently of a degree of contamination of the fluid flow in every active operating state of the apparatus;
a fluid heater in said supply line in fluid communication with and between said flow divider and said dewatering chamber; and
a fluid filter in said discharge line in fluid communication with and downstream of said fluid pump.

2. An apparatus according to claim 1 wherein
the fixed and defined ratio of first substream to the second substream is 50:50.

3. An apparatus according to claim 1 wherein
the fixed and defined ratio of the first substream to the second substream is 70:30.

4. An apparatus according to claim 1 wherein
the apparatus comprises a sensor;
said control valve connects said fluid pump in fluid communication selectively with said fluid reservoir and said fluid outlet of said dewatering chamber depending on the value measured by said sensor.

5. An apparatus according to claim 1 wherein
a filling level sensor in said dewatering chamber measures an amount of the fluid in said dewatering chamber.

6. An apparatus according to claim 1 wherein
first and second level sensors in said dewatering chamber measure amounts of the fluid in said dewatering chamber.

7. An apparatus according to claim 1 wherein
a gas supply and a gas discharge are connected in fluid communication with said dewatering chamber, said gas supplies dry gas to said dewatering chamber, and said gas discharge removes wet gas from said dewatering chamber.

8. An apparatus according to claim 7 wherein
a vacuum pump is in at least one of said gas supply or said gas discharge; and
said dewatering chamber comprises a vacuum tower.

9. An apparatus for dewatering fluids, comprising:
a dewatering chamber through which a fluid can flow for at least partial dewatering therein and having a fluid inlet and a fluid outlet;
a fluid reservoir;
a supply line connected in fluid communication with said fluid inlet of said dewatering chamber and said fluid reservoir to supply the fluid to be dewatered to said dewatering chamber said supply line including a shared line;
a discharge line connected in fluid communication with said fluid outlet of said dewatering chamber and said fluid reservoir for at least partially dewatered fluid, said discharged line also including said shared line, said shared line being selectively connected in fluid communication to said supply line and said discharge line;
a fluid pump in said shared line;
a control valve selectively connecting said shared line to said fluid reservoir in a first setting thereof or to said dewatering chamber in a second setting thereof;
a flow divider at an end of said shared line opposite said control valve, said flow divider having constantly open first and second conduits dividing fluid flow from said fluid pump into a first substream conveyed to said fluid inlet and a second substream conveyed to said fluid reservoir, said flow divider dividing the fluid flow from said fluid pump into the first and second substreams at a fixed and defined ratio of substreams independently of a degree of contamination of the fluid flow in every active operating state of the apparatus; and
a sensor, said control valve connecting said fluid pump in fluid communication selectively with said fluid reservoir and said fluid outlet of said dewatering chamber depending on the value measured by said sensor, said sensor being connected in fluid communication with said shared line and measuring at least one of contamination or water content of fluid flowing in said shared line, said sensor being connected in series with a valve connected to said reservoir.

10. An apparatus according to claim 9 wherein
a fluid heater is in said supply line in fluid communication with and between said flow divider and said dewatering chamber; and
a fluid filter is in said discharge line in fluid communication with and downstream of aid fluid pump.

11. An apparatus according to claim 9 wherein
said valve is a pressure relief valve.

* * * * *